US006139954A

United States Patent [19]
Dean et al.

[11] Patent Number: 6,139,954
[45] Date of Patent: *Oct. 31, 2000

[54] POLYESTERS CONTAINING NEOPENTYL GLYCOL AND FIBERS FORMED THEREFROM

[75] Inventors: Leron R. Dean; William A. Haile; Richard L. McConnell, all of Kingsport, Tenn.

[73] Assignee: Eastman Chemical Company, Kingsport, Tenn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/369,296

[22] Filed: Aug. 6, 1999

Related U.S. Application Data

[63] Continuation of application No. 09/143,437, Aug. 28, 1998, application No. 09/187,004, Nov. 6, 1998

[60] Provisional application No. 60/057,800, Aug. 28, 1997, and provisional application No. 60/064,717, Nov. 6, 1997.

[51] Int. Cl.[7] .............................. D02G 3/00; C08G 63/02
[52] U.S. Cl. .......................... 428/373; 528/272; 528/275; 528/279; 528/280; 528/286; 528/288; 528/291; 528/292; 528/298; 528/302; 528/307; 528/308; 528/308.6; 525/437; 525/444; 525/445; 428/221; 428/296.7; 428/480
[58] Field of Search .................................... 528/272, 275, 528/279, 280, 286, 288, 291, 292, 298, 302, 307, 308, 308.6; 525/437, 444, 445; 428/221, 296.7, 373, 480

[56] References Cited

U.S. PATENT DOCUMENTS

| | | | |
|---|---|---|---|
| Re. 32,765 | 10/1988 | Callander et al. | 524/382 |
| 2,901,466 | 8/1959 | Kibler et al. | 260/75 |
| 3,589,956 | 6/1971 | Kranz et al. | 156/62.4 |
| 3,907,754 | 9/1975 | Tershansy et al. | 260/75 |
| 3,962,189 | 6/1976 | Russin et al. | 260/75 R |
| 4,010,145 | 3/1977 | Russin et al. | 260/75 R |
| 4,081,428 | 3/1978 | Thompson | 260/75 |
| 4,093,603 | 6/1978 | Jackson, Jr. et al. | 260/75 R |
| 4,094,721 | 6/1978 | Sturm et al. | 156/309 |
| 4,116,942 | 9/1978 | Weinberg et al. | 528/283 |
| 4,189,338 | 2/1980 | Ejima et al. | 156/167 |
| 4,217,426 | 8/1980 | McConnell et al. | 525/173 |
| 4,340,526 | 7/1982 | Petke et al. | 524/292 |
| 4,356,299 | 10/1982 | Cholod et al. | 528/279 |
| 4,419,507 | 12/1983 | Sublett | 528/302 |
| 4,450,250 | 5/1984 | McConnell et al. | 524/141 |
| 4,468,490 | 8/1984 | Meyer, Jr. et al. | 524/311 |
| 4,521,556 | 6/1985 | Adams | 524/88 |
| 4,540,749 | 9/1985 | Meyer, Jr. et al. | 525/437 |
| 4,576,977 | 3/1986 | Miyazaki et al. | 523/137 |
| 4,576,997 | 3/1986 | Trotter et al. | 525/444 |
| 4,668,453 | 5/1987 | Ebnesajjad | 264/78 |
| 4,668,764 | 5/1987 | Satou | 528/308 |
| 4,740,581 | 4/1988 | Pruett et al. | 528/289 |
| 4,745,174 | 5/1988 | Pruett et al. | 528/289 |
| 4,749,772 | 6/1988 | Weaver et al. | 528/288 |
| 4,749,773 | 6/1988 | Weaver et al. | 528/288 |
| 4,749,774 | 6/1988 | Weaver et al. | 528/288 |
| 4,950,732 | 8/1990 | Weaver et al. | 528/288 |
| 4,999,388 | 3/1991 | Okamoto | 523/400 |
| 5,017,680 | 5/1991 | Sublett | 528/274 |
| 5,057,561 | 10/1991 | Manica et al. | 524/68 |
| 5,106,944 | 4/1992 | Sublett | 528/279 |
| 5,166,311 | 11/1992 | Nichols | 528/285 |
| 5,219,941 | 6/1993 | Meyer, Jr. et al. | 525/173 |
| 5,252,699 | 10/1993 | Chamberlin et al. | 528/289 |
| 5,292,783 | 3/1994 | Buchanan et al. | 524/37 |
| 5,312,797 | 5/1994 | Takiguchi et al. | 503/227 |

(List continued on next page.)

FOREIGN PATENT DOCUMENTS

| | | |
|---|---|---|
| 0 517 171 A2 | 12/1992 | European Pat. Off. . |
| 0 526 645 A1 | 2/1993 | European Pat. Off. . |
| 532 988 A1 | 3/1993 | European Pat. Off. . |
| 542 239 A1 | 5/1993 | European Pat. Off. . |
| 197 15 682 A1 | 10/1997 | Germany . |
| 63-203818 | 8/1988 | Japan . |
| 05-005212 | 1/1993 | Japan . |
| 5059616 | 3/1993 | Japan . |
| 5097985 | 4/1993 | Japan . |
| 8092816 | 4/1996 | Japan . |
| 8245778 | 9/1996 | Japan . |
| 1 029 136 | 5/1962 | United Kingdom . |
| 977 104 | 12/1964 | United Kingdom . |
| 1047072 | 11/1966 | United Kingdom . |
| 1053374 | 12/1966 | United Kingdom . |
| 1344492 | 1/1974 | United Kingdom . |
| WO 84/02144 | 6/1984 | WIPO . |
| WO 96/04422 | 2/1996 | WIPO . |
| WO 96/15173 | 5/1996 | WIPO . |
| WO 96/15174 | 5/1996 | WIPO . |
| WO 96/15175 | 5/1996 | WIPO . |
| WO 96/15176 | 5/1996 | WIPO . |
| WO 96/25446 | 8/1996 | WIPO . |
| WO 96/25448 | 8/1996 | WIPO . |
| 97/30102 | 8/1997 | WIPO . |
| WO 98/12245 | 3/1998 | WIPO . |
| 99/10573 | 3/1999 | WIPO . |
| 99/24648 | 5/1999 | WIPO . |

OTHER PUBLICATIONS

"Chemical Substances of Melty," Unitika Ltd., Product Brochure, Apr. 1993.
"Types of Bellcombi, " Kanebo Ltd., Product Brochure.

(List continued on next page.)

*Primary Examiner*—Samuel A. Acquah
*Attorney, Agent, or Firm*—Cheryl J. Tubach; Harry J. Gwinnell

[57] ABSTRACT

The invention relates to amorphous and crystalline fibers, particularly binder fibers, made from polyesters and the polyesters themselves. The polyesters of the invention are generally formed from a glycol component, such as a five carbon glycol, and a dicarboxylic acid component. The polyesters may be formed into a variety of products, for example fibers, composites and other molded articles. Preferably the polyesters are binder fibers for nonwovens, textile and industrial yarns and fabrics.

32 Claims, No Drawings

U.S. PATENT DOCUMENTS

| | | | |
|---|---|---|---|
| 5,340,907 | 8/1994 | Yau et al. | 528/274 |
| 5,340,910 | 8/1994 | Chamberlin et al. | 528/289 |
| 5,348,699 | 9/1994 | Meyer et al. | 264/176.1 |
| 5,372,864 | 12/1994 | Weaver et al. | 428/36.92 |
| 5,384,377 | 1/1995 | Weaver et al. | 525/437 |
| 5,385,773 | 1/1995 | Yau et al. | 428/221 |
| 5,393,863 | 2/1995 | Yau et al. | 528/308.4 |
| 5,393,871 | 2/1995 | Yau et al. | 528/308.4 |
| 5,446,079 | 8/1995 | Buchanan et al. | 524/41 |
| 5,453,479 | 9/1995 | Borman et al. | 528/279 |
| 5,559,171 | 9/1996 | Buchanan et al. | 524/41 |
| 5,563,236 | 10/1996 | Murata et al. | 528/295 |
| 5,580,911 | 12/1996 | Buchanan et al. | 524/41 |
| 5,599,858 | 2/1997 | Buchanan et al. | 524/41 |
| 5,608,031 | 3/1997 | Yau et al. | 528/281 |
| 5,643,991 | 7/1997 | Stipe et al. | 524/496 |
| 5,656,715 | 8/1997 | Dickerson et al. | 528/271 |
| 5,656,716 | 8/1997 | Schmidt et al. | 528/279 |
| 5,668,243 | 9/1997 | Yau et al. | 528/280 |
| 5,681,918 | 10/1997 | Adams et al. | 528/279 |
| 5,688,899 | 11/1997 | Strand et al. | 528/279 |
| 5,744,571 | 4/1998 | Hilbert et al. | 528/272 |
| 5,773,554 | 6/1998 | Dickerson et al. | 528/271 |
| 5,889,135 | 3/1999 | Warzelhan et al. | 528/176 |

OTHER PUBLICATIONS

"Textile Fibers Group Hoechst Celanese Corporation," Hoechst Celanese, Product Brochure.

"Improved Color Poly(ethylene/1,4–cyclohexylenedimethylene terephthalate)," Research Disclosure, No. 359, Mar. 1994, pp. 142–44.

R. Bass, "PCT and PETG Polyester Fibers for Nonwovens," INDA–TEC 96, Nonwovens Conference, 1996, pp. 19.1–19.9.

International Search Report, dated Apr. 8, 1999, in International Application No. PCT/US98/23599.

International Search Report, dated Feb. 2, 1999, in International Application No. PCT/US98/17813.

POLYESTERS CONTAINING NEOPENTYL GLYCOL AND FIBERS FORMED THEREFROM

PRIORITY DATA

This application claims benefit under 35 U.S.C. §120 of copending U.S. application Ser. No. 09/143,437 entitled "Improved Copolymer Binder Fibers," filed on Aug. 28, 1998, which claims benefit under 35 U.S.C. §119 of provisional application 60/057,800 filed Aug. 28, 1997 and U.S. application Ser. No. 09/187,004 entitled "Copolyester Binder Fibers" filed on Nov. 6, 1998 which claims benefit under 35 U.S.C. §119 of provisional application 60/064,717 filed Nov. 6, 1997. The disclosures of these applications are incorporated by reference herein in their entirety.

FIELD OF THE INVENTION

The invention relates to amorphous and crystalline fibers, particularly binder fibers, made from polyesters and the polyesters themselves. The polyesters of the invention are generally formed from a glycol component, such as a five carbon glycol, and a dicarboxylic acid component. The polyesters may be formed into a variety of products, for example fibers, composites and other molded articles. Preferably the polyesters are binder fibers for nonwovens, textile and industrial yarns and fabrics.

BACKGROUND OF THE INVENTION

Nonwoven fabrics are widely used in a variety of products. For example, nonwoven fabrics are suitable for use in filters, automotive applications, roofing materials, laminates, composites, backing materials, linings, insulation, medical/surgical applications, bedding, tablecloths and napkins, hygiene and absorbent products. High loft batting nonwoven fabrics are used in a wide variety of products, including comforters, robe wear, and bra cups. Generally nonwoven fabrics are based on polyester, acrylic, nylon, glass and cellulosic fibers which may be bonded with latex adhesives, binder fibers, or polymers in powder form. The bonding of nonwoven fabrics with binder fibers provides a convenient method for making nonwoven fabrics without the need for water-based adhesives which are less environmentally friendly. Nonwoven fabrics bonded with binder fibers are economical to produce, and provide a method for making articles, which are unique or superior in performance. Other applications are uses in yarns to increase strength and reduce pilling or linting, as well as uses in prepregs, preforms and a wide range of composite structures.

Certain copolyesters have proven useful as binder fibers. For example, polyethylene terephthalate (PET) copolyesters containing 1,4-cyclohexanedimethanol having inherent viscosity (I.V.) values in the range of about 0.6 to about 0.8 dl/g have been used in the past as binder fibers to bond polyester or other fibers. Polyesters with lower I.V. values, however, were believed to not have adequate bonding strength.

It is well known that copolyesters can be prepared by processes involving polyesterification and polycondensation. Generally, as described in U.S. Pat. Nos. 2,901,466, 5,017,680, 5,106,944 and 5,668,243, the reactants include glycol components and dicarboxylic acid components. Typically, one dicarboxylic acid component is terephthalic acid and one dihydric alcohol is ethylene glycol. Such copolyesters are relatively inert, hydrophobic materials which are suitable for a wide variety of uses, including, molded articles, such as those used in the automobile and appliance industries, food trays, fibers, sheeting, films and containers, such as bottles. The use of ethylene glycol as the only diol, however, is accompanied by undesirable properties such as yellow discoloration, weak and sometimes brittle fiber binding properties. Indeed, such polymers tend to be opaque, crystalline polymers with high melting temperatures which do make them very suitable for use as binder fibers in many applications. To remedy the problems with polyethylene terephthalates, polyethylene terephthalate polyesters have been formed with 1,4-cyclohexanedimethanol or isophthalic acid.

Previous attempts at forming copolyesters with 1,4-cyclohexanedimethanol have focused upon polyesters having high inherent viscosities, I.V., of greater than 0.6 dl/g, due to the belief that low inherent viscosities would not possess adequate strength. In particular, it was believed that low inherent viscosity polyesters were unable to provide adequate bonding strength to form commercially acceptable binder fibers. Indeed, previous polyethylene terephthalate polyesters containing 1,4-cyclohexanedimethanol were made with inherent viscosities ranging from 0.6 to 0.8 to form binder fibers to bond polyesters or other fibers. However, such attempts have not been entirely successful in providing polyesters having the desired high clarity and hue or bonding capability at low activation temperatures when in the form of a binder fiber.

Other attempts at forming polyesters suitable for use as binder fibers have focused on polyethylene terephthalate copolyesters which have been formed with isophthalic acid and diethylene glycol. Such attempts have resulted in unicomponent and bicomponent binder fibers sold as BELLCOMBI® available from Unitika of Osaka, Japan, MELTY® available from Kanebo, Ltd. of Osaka, Japan, CELBOND® available from KoSa and the like. Previous products however, have failed to recognize the clarity, bonding temperature, bonding strength and cost benefits that can be achieved through polyesters which are the reaction products of dicarboxylic acids and five carbon diols such as 2,2-dimethyl-1,3-propanediol, also referred to as neopentyl glycol (NPG).

There exists a need in the art for cost-effective polyesters, especially polyesters which possess improved clarity and color as well as improved binder fiber bonding strength at low activation temperatures.

SUMMARY OF THE INVENTION

The invention answers the problems connected with previous binder fibers and copolyesters by providing polyesters having excellent color, thermoplastic flow and increased bonding versatility as well as catalysts for producing such polyesters. The polyesters of the invention are suitable for use in a wide variety of applications, such as binder fibers for making nonwoven fabrics, textile and industrial yarns, and composites.

More specifically, the invention provides polyesters which are prepared with glycol components and dicarboxylic acid components. Generally, the glycol component contains a five carbon glycol, such as neopentyl glycol, alone or in combination with another glycol component, such as ethylene glycol. Typically, the dicarboxylic acid component comprises at least about 50 mole % of a dicarboxylic acid component which is an acid, anhydride, acid chloride or ester of an aromatic dicarboxylic acid containing from about 8 to about 14 carbon atoms, an aliphatic dicarboxylic acid containing from about 4 to about 12 carbon atoms, a cycloaliphatic dicarboxylic acid having about 8 to about 12 carbon atoms or mixtures thereof.

The polyesters of the invention are generally formed such that the resulting polyesters have inherent viscosities of less than about 0.80. The polyesters of the invention are capable of exhibiting excellent thermoplastic flow and bonding capability. Indeed, the polyesters of the invention are particularly suited for use as binder fibers as the polyesters may possess an I.V. which allows for improved bonding of the binder fiber for nonwoven fabrics at relatively low temperatures. The invention is discussed in more detail below.

DETAILED DESCRIPTION OF THE INVENTION

The invention relates to binder fibers made from polyesters, as well as to the polyesters themselves. The polyesters of the invention tend to possess excellent color as they are generally clearer, exhibit a more neutral hue or a brighter appearance than previous polyesters and may accept dyes more easily than previous polyesters. Indeed, with the invention, clear and non opaque polyester polymers may be formed and readily be processed into binder fibers having excellent binding properties. Furthermore, the processing of the polyesters into binder fibers may be aided by the use of the lower melt spinning temperatures of the preferred lowered I.V. copolyesters of the invention. For example, a 0.47 I.V. copolyester of the invention can be spun as low as 215° C.

The polyesters of the invention are formed from the reaction of a glycol component and a dicarboxylic acid component. Generally, the glycol component comprises a five carbon glycol, such as neopentyl glycol, in an amount ranging from about 8 to about 100 mole % and ethylene glycol in an amount ranging from about 0 to about 92 mole %. The dicarboxylic acid component typically contains at least about 50 mole % of an acid, anhydride, acid chloride or ester of an aromatic dicarboxylic acid containing from about 8 to about 14 carbon atoms, an aliphatic dicarboxylic acid containing from about 4 to about 12 carbon atoms, a cycloaliphatic dicarboxylic acid having about 8 to about 12 carbon atoms or mixtures thereof. These features and others are discussed in more detail below.

Glycol Component

As mentioned above, the glycol component generally comprises a five carbon glycol in an amount ranging from about 8 to about 100 mole %. Preferably the five carbon glycol is present in an amount ranging from about 12 to about 65 mole %, more preferably about 15 to about 35 mole %. The preferred five carbon glycol is neopentyl glycol. When the polyester is in the form of a binder fiber, it is generally preferred that the neopentyl glycol is present in an amount of from about 8 to about 50 mole % of the glycol component. Additionally, it is preferred that the composition contain ethylene glycol in an amount ranging from about 0 to about 92 mole %. More preferably, the ethylene glycol is present in an amount ranging from about 35 to about 88 mole % and most preferably about 65 to about 85 mole %.

In addition to the five carbon glycol, the glycol component may include up to about 20 mole %, and preferably up to about 4 mole % diethylene glycol and/or 1-3- or 1,4-cyclohexanedimethanol. Furthermore the glycol component may also include up to about 10 mole % of conventional glycols including, but not limited to, glycols containing about 3 to about 12 carbon atoms such as propylene glycol, 1,3-propanediol, 1,4-butanediol, 1,6-hexanediol, 2,2,4-trimethyl-1,3-propanediol, 2-ethyl-2-butyl-1,3-propanediol, 2,2,4,4-tetramethyl 1,3-cyclobutanediol, 2,4-dimethyl-2-ethyl-1,3-hexanediol, 2-ethyl-2-isobutyl-1,3-propanediol, 1,3-butanediol, 1,8-octanediol, 2,2,4-trimethyl-1,6-hexanediol, thiodiethanol, and 1,2-cyclohexanedimethanol. The cyclohexanedimethanol moieties may be present as the cis-, trans- or as a mixture of isomers. Small amounts of polymeric glycols such as poly(tetramethylene glycol) or poly(ethylene glycol) may also be used. In using such polymeric glycols, molecular weights ranging from 200 to 5000 are suitable.

Dicarboxylic Acid Component

The dicarboxylic acid component of the invention generally contains at least about 50 mole % of an acid, anhydride, acid chloride or ester of an aromatic dicarboxylic acid containing from about 8 to about 14 carbon atoms, an aliphatic dicarboxylic acid containing from about 4 to about 12 carbon atoms, a cycloaliphatic dicarboxylic acid having about 8 to about 12 carbon atoms or mixtures thereof. Preferably, the dicarboxylic acid component contains at least about 80 mole % and more preferably at least about 90 mole % of an acid, anhydride, acid chloride or ester of an aromatic dicarboxylic acid containing from about 8 to about 14 carbon atoms, an aliphatic dicarboxylic acid containing from about 4 to about 12 carbon atoms, a cycloaliphatic dicarboxylic acid having about 8 to about 12 carbon atoms or mixtures thereof. In a preferred embodiment of the invention, the dicarboxylic acid component contains about 90% or more of an acid, ester or anhydride of terephthalic acid, isophthalic acid, naphthalenedicarboxylic acid, and 1,3- or 1,4-cyclohexanedicarboxylic acid. It is most preferred that the dicarboxylic acid component is an ester or acid of terephthalic acid. It should be noted that any of the naphthalenedicarboxylic acid isomers or mixtures of isomers may be used with the 1,4-, 1,5-, 2,6- and 2,7-isomers being preferred with the 2,6-isomer being most preferred. Additionally, the 1,3- or 1,4-cyclohexanedicarboxylic acid moieties may be as the cis-, trans- or cis/trans mixtures of isomers.

Suitable additional dicarboxylic acid components which may be added in amounts up to about 10 mole % of the dicarboxylic acid component, generally contain about 4 to about 40 carbon atoms, for example, an acid or ester of an aromatic, aliphatic or cycloaliphatic dicarboxylic acid. Suitable additional dicarboxylic acids or ester are described in U.S. Pat. Nos. 5,608,031 and 5,668,243, herein incorporated by reference in their entirety. Particularly preferred examples of additional dicarboxylic acid components include, but are not limited to, sulfoisophthalic acid, 1,4-cyclohexanediacetic acid, diphenyl-4,4'-dicarboxylic acid, and dimer acid. Suitable polyesters may be prepared from one or more of the above dicarboxylic acids.

Amine Compounds

It is also possible to form the polyesters of the invention in the presence of up to about 20 mole % of an amine compound. Suitable amine containing compounds, include, but are not limited to, aminoalcohols and diamines in an amount of up to about 20 mole % of the glycol component or amine compounds such as aminoacids and lactams in an amount of up to about 20 mole % of the dicarboxylic acid component. The presence of the aminoalcohols, aminoacids, diamines or lactams in the glycol and dicarboxylic acid components provides for the formation of polyesteramides. These polyesteramides having an I.V. of 0.8 dl/g or less, have good binder fiber properties and, in addition, have excellent dyeing characteristics. In particular, deeper dyeing may be achieved through the use of the polyesteramides as compared to unmodified polyethylene terephthlate having the same I.V.

Generally, aminoalcohols for the invention include, but are not limited to, 2-aminoethanol and 4-aminomethylcyclohexanemethanol. Typical diamines include, but are not limited to, ethylenediamine, trimethylenediamine, tetramethylenediamine, pentamethylenediamine, hexamethylenediamine, octamethylenediamine, dodecamethylenediamine and 1,4-cyclohexane-bis-methylamine. Additionally, examples of suitable lactams include, but are not limited to, caprolactam, laurolactam and azacyclododecan-2-one.

Branching Agents

Polyesters of the invention may be linear or branched. By adding a branching agent to the reaction of the glycol and dicarboxylic acid components, the melt strength of the resulting polyester may be increased. Small amounts, typically less than about 2 mole %, of conventional branching agents may be reacted with the glycol component and dicarboxylic acid component to form the inventive polyesters. Conventional branching agents include polyfunctional acids, anhydrides, alcohols and mixtures thereof. Examples of suitable branching agents, include, but are not limited to, trimellitic anhydride, pyromellitic dianhydride, glycerol, trimethylolpropane, and pentaerythritol.

Reaction Process for Forming the Polyesters In forming the polyesters of the invention, the reaction of the glycol component and the dicarboxylic acid component may be carried out using conventional polyester polymerization conditions. When preparing the polyesters by means of an ester interchange reaction, i.e., from the ester form of the dicarboxylic acid components, the reaction process may comprise two steps. In the first step, the glycol component and the dicarboxylic acid component, such as, for example, dimethyl terephthalate, are reacted at elevated temperatures, typically, about 180° C. to about 280° C. and pressures ranging from about 0.0 to about 60 psig. Preferably, the temperature for the ester interchange reaction ranges from about 190° C. to about 240° C. while the preferred pressure ranges from about 15 psig to about 40 psig. Thereafter, the reaction product is heated under still higher temperatures and under reduced pressure to form polyester with the elimination of glycol, which is readily volatilized under these conditions and removed from the system. This second step, or polycondensation step, is continued under higher vacuum and at a temperature which generally ranges from about 240° C. to about 300° C., preferably about 250° C. to about 280° C. and most preferably about 260° C. to about 275° C., until a polyester having the desired degree of polymerization, determined by I.V., is obtained. In order to obtain polymers with particularly excellent color, it may be desirable to limit the final polycondensation temperature to about 275° C. The polycondensation step may be conducted under reduced pressure which ranges from about 400 mm Hg (torr) to about 0.1 mm Hg (torr).

To ensure that the reaction of the glycol component and dicarboxylic acid component by an ester interchange reaction mechanism is driven to completion, it is preferred to employ a stoichiometric excess of glycol component. For example, 3 moles and more preferably about 2.0 to about 2.6 moles of glycol component to one mole dicarboxylic acid component. However, the ratio of glycol component to dicarboxylic acid component is generally determined by the design of the reactor in which the polymerization reaction process occurs.

To prepare a polyester by direct esterification, i.e., from the acid form of the dicarboxylic acid component, polyesters are produced by reacting the acid form of the dicarboxylic acid component with the glycol component. For example, isophthalic acid and terephthalic acid could be directly reacted with the glycol component. A direct esterification reaction may be conducted at a pressure of from about 1 to about 200 pounds per square inch gauge pressure. To produce a low molecular weight, linear or branched polyester product having an average degree of polymerization of from about 1.4 to about 10, it is preferred that a pressure of less than 100 psig is employed. The temperatures employed during the direct esterification reaction typically range from about 180° C. to about 280° C., more preferably ranging from about 220° C. to about 270° C. This low molecular weight polymer may then by polymerized by a polycondensation reaction.

To ensure that the reaction of the glycol component and dicarboxylic acid component by a direct esterification reaction mechanism is driven to completion, it is preferred to employ a stoichiometric excess of the glycol component. For example, about 3.0 to 1.01 moles, more preferably 2.5 to 1.1 moles glycol component to one mole dicarboxylic acid component. It being understood, however, that the ratio of glycol component to dicarboxylic acid component will be determined by the design of the reactor in which the reaction process occurs.

Lower I.V. polyesters are generally obtained by employing shorter residence times or slow reaction rates as compared to processes for forming higher I.V. polyesters. For example, the reaction rate can be slowed by reducing the reaction temperature, reducing the catalyst concentration, by increasing the absolute pressure in the reactor or by a combination of these factors.

The process of forming the polyesters of the invention may be conducted as a batch, semi-batch or continuous process. Advantageously the process is operated as a continuous process. Indeed, it is possible to produce superior coloration of the polyester when using a continuous process as the polyester may deteriorate in appearance if the polyester is allowed to reside in a reactor at an elevated temperature for too long a duration.

Catalyst System

A variety of catalyst systems are useful in promoting the reaction of the glycol component and the dicarboxylic acid component. Generally, without the aid of a suitable catalyst, the polymerization reactions do not proceed at a noticeable rate. Typically a catalyst system will contain catalytic materials and catalytic inhibitors.

Catalytic Materials

Catalytic materials which are suitable for the catalyst system include, but are not limited to, materials containing titanium, manganese, zinc, cobalt, antimony, gallium, lithium, calcium, silicon, and germanium. Such catalyst systems are described in U.S. Pat. Nos. 3,907,754, 3,962,189, 4,010,145, 4,356,299, 5,017,680, 5,668,243, and 5,681,918, herein incorporated by reference in their entirety. Generally, the catalyst system of the invention comprises materials which contain titanium, manganese and/or zinc and mixtures thereof. While the amounts of the individual catalytic materials in the catalyst system will vary, it is desired that the total amount of catalytic materials in the catalyst system be below about 125 ppm, preferably below about 100 ppm and most preferably below about 80 ppm. The "ppm" for the catalytic materials in the catalyst system and the catalytic inhibitor described below, refers to the weight of the element referred to and is based upon the weight of the final polyester product.

While titanium catalytic materials may be added in the form of complexed materials such as those described in U.S. Pat. No. 5,017,680, the titanium catalytic materials are preferably added in the form of an alkoxide in an amount ranging from about 10 to about 35 ppm, more preferably about 10 to about 25 and most preferably about 12 to about 20 ppm. Indeed, copolyesters formed with lower levels of titanium catalytic materials have better stability when held in the melt. Suitable titanium alkoxides include, but are not limited to, acetyl triisopropyl titanate, tetraisopropyl titanate and tetraisobutyl titanate. Particularly preferred titanium catalytic materials include acetyl triisopropyl titanate and tetraisopropyl titanate. The titanium catalytic material may be added to the reaction process prior to direct esterification or ester interchange reaction or prior to the polycondensation reaction.

Manganese catalytic materials are typically added in the form of a salt, such as an organic acid salt in an amount ranging from about 0 to 70 ppm, preferably about 20 to about 70 ppm, more preferably about 30 to about 70 ppm and most preferably about 40 to about 70 ppm. Examples of suitable manganese catalytic salts include, but are not limited to, manganous benzoate tetrahydrate, manganese chloride, manganese oxide, manganese acetate, manganese acetylacetonate, and manganese succinate. Manganese is added to the reaction process prior to a direct esterification or ester interchange reaction.

Zinc may be added to the catalyst system in addition to the manganese or in place of the manganese catalyst. Zinc catalytic materials are typically added in the form of a salt in an amount ranging from 0 to 100 ppm, preferably about 25 to about 100 ppm and more preferably about 50 to about 80 ppm. Examples of suitable zinc compounds include, but are not limited to, zinc acetate, zinc succinate, and zinc alkoxide. Zinc is typically added to the reaction process prior to an ester interchange reaction.

If desired, a cobalt catalytic material, may also be employed as part of the catalyst system. When employed, cobalt is typically added in the form of a salt, such as an organic acid salt. Examples of suitable cobalt salts include, but are not limited to, cobaltous acetate trihydrate, cobaltous nitrate, cobaltous chloride, cobalt acetylacetonate, cobalt naphthenate, and cobalt salicylate. Cobalt may be added in an amount of up to about 100 ppm, more preferably up to about 90 ppm. As described below, the cobalt may function as both a catalytic material and as a colorant. As a colorant, cobalt is generally added to the reaction process after a direct esterification or ester interchange reaction. As cobalt is generally used as a colorant, the amount of cobalt is not considered when calculating the total amount of catalytic material.

In some embodiments antimony may be employed, however, it is preferred that the catalyst system not contain antimony. Indeed, it is preferred that the polyesters, and the fibers and binder fibers formed therefrom, do not contain any antimony catalytic materials. When used, however, suitable antimony compounds include, but are not limited to, antimonate esters of inorganic acids, antimony oxide, antimony alkoxides such as antimony isopropoxide, antimony halides, such as antimony chloride, antimony bromide and antimony fluoride, sodium or potassium antimonate, antimony carboxylates, such as antimony acetate and antimony glycolate or mixtures thereof. Preferably the antimony component is an antimony glycolate or an antimony oxide. Antimony is generally added after the ester interchange or a direct esterification reaction. When the copolyester is used to form binder fibers, antimony may be omitted from the catalyst system to avoid deposit buildup on the spinnerette face caused by the presence of an antimony containing catalyst.

While less preferred, calcium, gallium and silicon catalytic materials may be used in the catalyst system. Examples of suitable calcium catalytic materials include, but are not limited to, calcium acetate, calcium glycoxide, and calcium phosphate monohydrate. Examples of suitable gallium catalytic materials include, but are not limited to, gallium chloride, gallium nitrate hydrate, gallium oxide, gallium lactate and gallium phosphide. Examples of suitable silicon catalytic materials include, but are not limited to, silicon acetate and tetraethyl orthosilicate. Germanium catalytic materials include, but are not limited to oxides, organic salts and in particular glycolates of germanium.

A preferred ester interchange catalyst system for reacting dicarboxylic acid component esters with glycols with glycols contains titanium, manganese, and optionally cobalt, catalytic materials. In the ester interchange catalyst system, the titanium is present in an amount ranging from about 10 to about 35 ppm, preferably about 10 to about 25 ppm and the manganese is present in an amount ranging from about 30 to about 70 ppm. Additionally, in another embodiment of the ester catalyst system, the total amount of catalytic materials in the catalyst system is less than or equal to about 125 ppm, preferably less than about 100 ppm, more preferably less than about 80 ppm and most preferably less than 70 ppm. A preferred ester catalyst system is typically used in combination with a catalytic inhibitor comprising about 40 to about 90 ppm phosphorus; and a colorant in an effective amount, for example, about 2 to about 10 ppm of a blue and/or red substituted anthraquinone dye. Generally, the preferred ester interchange catalyst system is substantially free of zinc catalytic materials, more preferably contains less than 5 ppm zinc catalytic materials and most preferably is free of zinc catalytic materials. Additionally, when binder fibers are desired, the preferred ester catalyst system is substantially free of antimony catalytic materials, more preferably contains less than 5 ppm antimony catalytic materials and most preferably is free of antimony catalytic materials.

Catalytic Inhibitor

To stabilize the effects of the catalyst system and to promote efficiency of zinc, manganese and cobalt catalytic materials, it is desirable to add a phosphorus catalytic inhibitor to the reaction process after an ester interchange or direct esterification reaction but prior to conducting the polycondensation reaction step. Typically, phosphorus is added in the form of a phosphate, such as phosphoric acid or an organic phosphate ester in an amount ranging from about 40 to 90 ppm and more preferably ranging from about 60 to 75 ppm. Suitable phosphate esters for use in this invention include, but are not limited to, ethyl acid phosphate, diethyl acid phosphate, triethyl phosphate, arylalkyl phosphates and tris-2-ethylhexyl phosphate. One useful phosphate catalytic inhibitor is sold under the Merpol® A tradename which is commercially available from Du Pont de Nemours of Wilmington, Del.

Colorants

In forming the copolyesters of the invention, colorants, sometimes referred to as toners, may be added to impart a desired neutral hue and/or brightness to the resulting polyester. This helps offset any naturally occurring yellowness in the polyester. When colored polyesters are desired, pigments or colorants may be included in the reaction mixture during the reaction of the glycol component and the dicarboxylic acid component or they may be melt blended with the preformed copolyester. A preferred method of including colorants is to copolymerize thermally stable organic colorant having reactive groups such that the colorant is incorporated into the copolyester to improve the hue of the copolyester. For example, colorants such as dyes possessing reactive hydroxyl and/or carboxyl groups, including, but not limited to, blue and red substituted anthraquinones, may be copolymerized into the polymer chain. Colorants and dyes are described in detail in U.S. Pat. Nos. 4,521,556, 4,740,581, 4,749,772, 4,749,773, 4,749,774, 4,950,732, 5,252,699, 5,384,377, 5,372,864, 5,340,910 and 5,681,918, herein incorporated by reference in their entirety. When dyes are employed as colorants, they may be added to the copolyester reaction process after an ester interchange or direct esterification reaction. Furthermore, when a dye or dye mixture is employed as the toner colorant for the copolyester, it is preferred that the total amount of dye is less than 10 ppm. Additionally, in a preferred embodiment of the invention, the colorant is free of cobalt, i.e., the colorant employed produces the desired color in the absence of cobalt.

Alternatively, inorganic pigments, such as titanium dioxide and cobalt containing materials, may be added to the reaction. Advantageously when a catalyst material contains cobalt, the cobalt may also act as a colorant. Care must be taken to control the amount of cobalt in order to avoid opacity and dinginess in the polyesters of the invention. To control the amount of opacity and dinginess, cobalt may be employed in an amount ranging up to about 90 ppm.

Polyesters of the Invention

The polyesters of the invention have an inherent viscosity, I.V., ranging from about 0.38 to 0.80 dl/g. Preferably the polyesters of the invention have an I.V. ranging from about 0.40 to about 0.62 dl/g, more preferably 0.42 to about 0.60 dl/g and most preferably about 0.45 to about 0.58 dl/g. Additionally, when the polyesters of the invention are employed for binder fiber uses, it is preferred that the fibers have an I.V. of less than about 0.7 and more preferably less than about 0.65.

The I.V. of the polyesters of the invention may be determined by measuring the I.V. at 25 ° C. using 0.5 g polymer per 100 mL of a solvent consisting of 60% by weight phenol and 40% by weight tetrachloroethane. The basic method of determining the I.V. of a polyester is set forth in ASTM D-2857-70. The polyesters produced with low I.V. values possess excellent color as they are clearer than previous polyesters and may accept dyes more easily than higher I.V. polyesters. Furthermore, low I.V. polyesters are generally more easily dyed at lower temperatures and more easily printed than similar higher I.V. polyesters. Additionally, since the polyesters of the invention generally have low I.V. values, the production rates of the polyesters are quite rapid.

The polymerization of the glycol component and the dicarboxylic acid component may be controlled to form either crystalline or amorphous polyethylene terephthalate copolyesters with glass transition temperatures similar or slightly lower than polyethylene terephthalate. The selection and amount of the dicarboxylic acid components and the glycol components will generally determine if the resulting polyester is amorphous or crystalline. As is known in the art, amorphous polymers generally have higher clarity and are not opaque like many crystalline polymers. Therefore, while some of the neopentyl glycol levels employed may form crystalline polyesters, the superior clarity of amorphous polyesters provides some distinct advantages.

Methods for determining the degree of crystallinity are known in the art, for example, differential scanning calorimetry (DSC), density gradient tubes, and x-ray diffraction techniques. Methods for determining crystallinity are discussed in U.S. Pat. No. 5,643,991, herein incorporated by reference in its entirety. Although any method known in the art would be acceptable to determine the degree of crystallinity, the differential scanning calorimetry method is preferred. For DSC analysis, a sample is heated and the temperature is monitored. A crystallization transition and/or crystalline melting transition is observed for upon heating a crystalline material. A crystalline polymer will have a well defined crystalline melting peak and temperature. In contrast, an amorphous material will have no crystallization or crystalline melting transition., i.e., no definite melting point. The degree of crystallinity is generally determined by measuring the area under the endotherm peak.

Generally, a lower I.V. polyester will have a lower extrusion temperature. Hence, polyesters of the invention may advantageously be melt spun into fibers at a lower temperature. For example a polyester of the invention with an I.V. of 0.47 may be melt spun at a temperature of approximately in the range about 225 to about 240° C. whereas similar non-neopentyl containing polyesters with an I.V. of 0.6 to 0.7 generally require fiber spinning at a temperature of 275 to 285° C. Typically, a polyester of the invention is melt spun at a temperature of less than about 265° C., in some cases as low as about 215° C. These polyesters can be readily melt spun through a spinnerette with about 332 holes and a hole size of about 0.55 mm. Generally, the melt spinning pressures will vary from about 1000 psig to 2000 psig.

The polyesters of the invention, especially low I.V. polyesters, are capable of bonding activation at lower temperatures and have improved melt flow at lower temperatures than previous copolyesters, as measured by the Kayeness instrument, which is similar to the Tinius Olsen Indexer. This improved melt flow may beneficially result in stronger bonds at lower temperatures or shorter exposures and allows for higher manufacturing speeds in the nonwoven bonding activation step. The use of lower bonding temperatures aids in minimizing detrimental effects to higher melting point fibers when they are blended with the polyesters of the invention. For example, the use of lower bonding temperatures aids in the reduction of discoloration, shrinkage, loss of crimp and resiliency, change of tactile aesthetics, less volatilization and smoking of fiber finishes. Typically, the clarity and color (hue) of the polyesters may be evaluated using a standard spectrocolorimeter. For example, a suitable spectrocolorimeter for evaluating the clarity and color of the polyester is a HunterLab UltraScan which is commercially available from HunterLab of Reston, Va. Through the use of a HunterLab UltraScan spectrocolorimeter, the clarity and color, i.e., yellowness and/or blueness may be quantified. The use of a HunterLab UltraScan spectrocolorimeter for evaluating and quantifying the color and clarity of a polyester is described in U.S. Pat. No. 5,681,918, herein incorporated by reference in its entirety. When using the HunterLab UltraScan an L★ value indicates the level of clarity with higher L★ values representing higher levels of clarity. The level of yellowness and/or blueness is quantified as a b★ value with 0.0 representing neutral, whereas values above 0.0 indicate levels of yellowness and values below 0.0 indicate the level of blueness in the copolyester. The copolyesters of the invention preferably have an L★ value of more than about 60, more preferably more than about 65 and a b★ value preferably varying from between about −3.5 to about +3.5, more preferably −2.5 to about +2.5.

Products Formed from Polyesters of the Invention

The polyesters of the invention may be used to form an article of manufacture or be used as an additive, such as a compounding additive concentrate or master batch for another polymer system. In addition, binder fibers and other articles may be formed with the polyesters that include, but are not limited to, filtration, automotive and structural preforms containing glass, polyester or other fibers, molded parts, sheeting and extruded films and fibers. The polyesters of the invention may be part of the articles to be formed or may form the entire article.

Conventional additives may be added to the polyesters of the invention, depending upon the desired end use of the polyester. Suitable additives for the polyesters are described in detail in U.S. Pat. No. 5,608,031 and 5,773,554 herein incorporated by reference in their entirety. Typical additives for the polyesters include pigments, antioxidants, stabilizers, flame retardants, mold release agents, nucleating agents, tougheners, epoxy compounds, impact modifiers, adhesion promoters, conducting or antistatic agents, wetting agents, liquid repellent agents, free radical stabilizers, other surface modifiers, lubricants, viscosity modifiers, dye promoters and other processing agents.

A preferred article of the invention is a fiber. The fiber may be prepared in any desired length known in the art and generally in the form of a continuous filament or staple fiber. Fibers may be made from the polyesters of the invention through any conventional means available including, but not limited to, melt spinning into fibers or directly into fabrics, the latter including spunbond and melt blown nonwovens. Depending upon the end use, any desired denier may be formed with the fibers employing polyesters of the invention, including fibers having a denier value ranging from microdenier to about 75 denier, preferably up to about 20 denier, most preferably about 1.5 to about 15 denier.

Fibers formed by extruding and spinning polyesters of the invention are easier to dye and are deeper dyeing as compared to polyethylene terephthalate homopolymers when employing the same aqueous dyeing conditions. Indeed, dyeing of the inventive polyesters to a deeper depth of shade is possible when employing similar dyeing conditions. Conversely, the same depths of shade can be achieved with lower dyeing costs as compared to the dyeing of polyethylene terephthalate homopolymers. When these fibers are formed into fabrics, they are also more readily printed compared to unmodified PET fabrics.

The polyesters may be used to form fibers, such as binder fibers, in any desired configuration known in the art. The polyesters of the invention are preferably binder fibers having the form of, or incorporated into, a fibrous structure. A major advantage of binder fibers is that bonded products containing the binder fibers can be obtained by applying heat, radio frequencies or ultrasonic frequencies to a web or unbonded batt of filaments, with or without pressure. Upon activation, the polyester softens and flows and upon cooling forms a solid bond with neighboring fibers. Indeed, the polyesters of the invention are particularly suited for use as binder fibers as the polyesters can possess a lower I.V. which allows better flow and softening properties at lower temperatures. Hence, improved bonding of the binder fiber may be possible at lower temperatures than previously known binder fibers for nonwoven fabrics when employing binder fibers containing the polyesters of the invention. Indeed, the binder fibers formed from the polyesters of the invention are particularly suited for bonding to polyester, acrylic, nylon, glass, cellulosic fibers, such as cotton, rayon, acetate and pulp-based fibers, and scoured wool. Typically, the binder fibers formed with the polyesters of the invention will have deniers of about 1.5 to about 20. However, other fibrous forms such as melt blown webs or spunbonded materials may have microdenier sizes.

The binder fibers of the invention may be in the form of unicomponent or bicomponent binder fibers or other multicomponent forms. For example, tricomponent fibers are also a possibility, utilizing a variety of polymers and polymer variants, sometimes with the intermediate layer being a tie-layer to promote interfacial adhesion. The tie-layer can be the polyester of the invention or blends of this polyester with other polymers. Similarly, the polyester of this invention can be used as a tie-layer in laminating and extrusion coating.

Bicomponent binder fibers may have a sheath/core, side by side, or other configuration known in the art. For example, shaped binder fibers may be formed with the cross-sectional legs capped with binder materials during extrusion. The process of preparing and bonding a low melt temperature bicomponent binder fiber is described in detail in U.S. Pat. No. 3,589,956, herein incorporated by reference in its entirety. In a bicomponent fiber of the invention, the polyesters of this invention will be present in amounts of about 10 to about 75 weight % of the bicomponent fiber. The other component may be from a wide range of other polymeric materials including, but not limited to, polyesters such as polyethylene terephthalate (PET), polytrimethylene terephthalate (PTT), polycyclohexylenedimethylene terephthalate (PCT), polybutylene terephthalate (PBT), polylactic acid based polymers or mixtures thereof. Bicomponent binder fibers may be blended with other fibers or used alone to make nonwoven fabrics and high loft battings having various properties. Generally, bicomponent binder fibers contain a polymer having a high melting point to ensure structural integrity during the bonding process and a lower melting or amorphous polymer to facilitate bonding. Sometimes, economics may dictate that a much less expensive core material be used.

Binder fibers from this invention are readily blended with a wide range of other fibers and subsequently heat or energy activated to provide nonwoven fabrics having good integrity and strength. For example, other fibers in the blends could include, but are not limited to polyester, acrylic, nylon, glass, cellulosic (cotton, pulp-based fibers, cellulose ester fibers etc.) and other natural and synthetic fibers. Incorporation in nonwovens can also aid lamination to other fabrics, films and some metallic surfaces. The amount of binder fiber in the nonwoven blend will generally be in the range of about 5 to about 30 weight %, although amounts as little as 2 weight % can also be used. In some instances fabrics are formed using 100% binder fibers.

Another fibrous structure which may be made with the polyesters of the invention is a fiber which is formed by melt blending less than about 50% of the polyester with a polyolefin or functionalized polyolefin or a polyester other than the polyester of the invention. When melt blending, suitable compatibilizers may be employed for their desired effects. The melt blended polyester/polyolefin may be spun as a fiber to form a fibrous structure. This melt blending allows polyolefins to be spun in a natural state and dyed in separate subsequent operations, something which cannot be satisfactorily achieved with unmodified polypropylene. Additionally this melt blending or fibers spun from this melt blend have a lower contact angle with water as compared to unmodified polypropylene.

The polyesters may also be used as an additive in polyethylene terephthalate (PET), polytrimethylene terephthalate (PTT), polybutylene terephthalate (PBT), polycyclohexylenedimethylene terephthalate polyesters (PCT) or polyethylene naphthalenedicarboxylate (PEN) and other polyesters to enhance fiber disperse dye uptake and make it deeper dyeable, thus improving the depth of shading with the same amount of dye under the same conditions employed for dyeing polyesters other than those of the invention, for example a polyethylene terephthalate polymer having the same I.V. This technique can also enhance printability as compared to a polyethylene terephthalate polymer having the same I.V.

The fibrous structures of the invention are particularly useful for processing into a wide variety of nonwoven, textile and tufted forms which may be activated in many different ways, including dry and wet heat, as well as ultrasonic and radio frequency energy. They are also suitable for use in making a wide variety of products including, but not limited to, high loft battings, needlepunched fabrics, flat nonwovens, spunbonds, hydroentangled fabrics, stitch-bonded fabrics, wet-laid nonwovens and paper, woven and knit fabrics, filter media, face masks, bath mats, scatter rugs, cotton and polyester carpeting, cellulosic insulation, absorbent products, furniture and auto seating and upholstery, fiber board, fiberglass composites, fillings for pillows and sleeping bags, cushions, quilts, comforters, coverlets, mattresses, mattress pads, mattress covers, bedspreads, pile fabrics for industrial and apparel uses, blankets, women's robes, interlinings, tiles, carpets, other floor covering materials, outerwear, foot- and handwear, ribbons, decorative yarns and fabrics, and molded articles.

Another suitable use for the polyesters of the invention is as a compounding carrier material. For example, the polyester of the invention may be mixed with additives, including colorants, to form a concentrate or masterbatch where the polyester acts as a carrier material. This concentrate or masterbatch may be combined with another polymer in a later process to provide color, opacity, flame retardancy or other beneficial properties. Polyesters of the invention will accept higher levels of additives, such as pigments, than polyethylene terephthalates of similar inherent viscosities. The polyester may be blended or mixed by any suitable technology known in the art.

The polyesters of the invention may also be blended with a wide range of other polymers as a component of the masterbatches but not the carrier material. Such other polymers, include other polyesters, polyamides, cellulose esters, polycarbonates, polyolefins and the like. Such masterbatches may subsequently be blended with more of the same or different polymers to be used in fibers, molded articles, sheeting or films to alter or to enhance properties. Copolyesters of the invention will accept higher levels of additives, such as pigments, than polyethylene terephthalates of similar inherent viscosities. The copolyester may be blended or mixed by any suitable technology known in the art. The copolyesters of the invention may be in the form of an additive which is a melt blend of the inventive copolyesters and a first polymer, wherein the additive when blended with a second polymer, which may be the same or different than the first polymer, is capable of forming a fiber. Thus, any fiber which contains, in whole or in part, the polyesters of the invention, is encompassed by this invention.

The following examples are intended to illustrate, but not limit, the scope of the present invention.

EXAMPLES

Example 1

Low Viscosity PET Copolyester Containing NPG

A polyethylene terephthalate (PET) copolyester containing 20 mole % NPG was prepared in a melt phase polycondensation using a catalyst system containing 25 ppm Ti, 40 ppm Mn, 55 ppm Co and 60 ppm P. This copolyester had an I.V. of 0.59 and a glass transition temperature of 78° C. The copolymer was crystallized by heating it in an oven at 150° C. for 3 hours. The copolyester then showed a melting point of 182° C. and heat of fusion of 0.18 cal/gram as determined on Differential Scanning Calorimeter (DSC) equipment.

Pellets of this copolyester were dried at 50° C. for 4 hours and were then melt extruded into multifilament fibers of 9 denier/filament using a spinnerette having 332 holes (0.55 mm orifice) at a take-up speed of 1000 m/m, a melt temperature of 265° C. and an extrusion rate of 43 pounds per hour. An air flow of 145 cubic feet per minute was used to quench the filaments during extrusion. The as-spun fibers were subsequently drafted in a 3:1 draft ratio and continued in a one stage drawing process using a 68° C. water bath, followed by a heated chamber, with no fiber exposure to live steam. The fibers were then stuffer box crimped to provide 7 crimps per inch and a crimp angle of 95 degrees using a clapper setting of 9.5 psi with no steam. The fiber was dried in a relaxed state at 60° C. for 2 minutes. The resultant staple fiber was 3.1 denier per filament (d/f)×38 mm.

The as-spun, undrawn form of the above fiber is also an effective binder fiber. For example, a 4 d/f as-spun binder fiber is especially suitable for lightweight nonwovens where low shrinkage is desirable. Similarly, beneficial results are achieved when the polyester pellets are not dried prior to the spinning operation.

Fibers can also be readily produced from PET copolyesters formed with 12 mole % NPG (I.V. 0.47) or 30 mole % NPG (I.V. 0.60).

Example 2

Preparation of Nonwoven Web

A 3 denier per filament, unicomponent binder fiber from Example 1 was blended with PET staple fibers (2¼ denier per filament) to provide a blend containing 20 weight % binder fiber. A 1¼ oz/yd intimately blended nonwoven web was formed on a carding line. The binder fibers in the nonwoven web were then activated by conveying the web through an infrared oven, followed by hot nipping (190° C.) to bond the fibers to the nonwoven web. Good machine and cross direction tensile strength and drapeability were obtained. Good bonding was also obtained by passing the web from the card through an air circulating oven at 200° C. for a two minute dwell time.

Binder fibers from the compositions of this invention are also radio frequency activatable. Similarly beneficial results are achieved when the binder fiber is a 1,4-cyclohexanedicarboxylic acid (PEC) copolyester containing 25 mole % NPG or a naphthalenedicarboxylic acid (PEN) copolyester containing 10 mole % isophthalic acid (IPA) and 25 mole % NPG.

Example 3

Sheath/Core Bicomponent Fiber

A 50/50 sheath/core bicomponent fiber was made using polyethylene terephthalate homopolymer (I.V. 0.54) as the core and a polyethylene terephthalate copolyester similar to that in Example 1 (I.V. 0.47) as the sheath. The bicomponent fiber was formed as follows:

Crystallized, dried pellets of PET were melted in an extruder and fed as the core at a melt temperature of 288° C. Dried pellets of PET copolyester were transported to the feed hopper of a second extruder feeding the sheath melt stream. The sheath stream was then fed to the block at a temperature of 240° C. The molten streams were subsequently coextruded through a spinnerette having a sheath/core hole configuration at metering rates adjusted to produce fibers having a 50% copolyester sheath/50% PET core. The fibers were drawn on rolls to produce 3.8 denier per filament fibers. A similar 40/60 sheath/core bicomponent fiber was also produced in filament and staple form. For staple, the fibers were then crimped and cut into 38 mm lengths. These bicomponent binder fibers are usefull in making nonwovens, composites and other formed materials when incorporated or combined with polyethylene terephthalate, glass and/or other matrix fibers, fabrics or films. For some nonwoven structures, these binder fibers can also be used in 100% form.

Example 4

Low Viscosity PET Copolyester Containing IPA and NPG

Using the catalyst system described in Example 1, a PET copolyester containing 5 mole % IPA and 15 mole % NPG was prepared. This polyester possessed an I.V. of 0.58. Dried samples of this polyester were melt spun using the technique described in Example 1 to provide as-spun multifilament binder fibers of 12 d/f. These fibers were drafted, crimped and cut to provide staple fibers of 3.5 d/f. These binder fibers were blended with PET fibers to form a blend containing 15 weight % binder fiber. The blend was bonded by passing it through an infrared oven as described in Example 2.

Filament fibers can also be readily melt spun from the polyester of this example to provide filaments of 6 d/f. These filaments are readily intermingled or continuously blended with glass filament fibers at a 7% binder fiber level, chopped into staple and converted into roving which was then formed into a composite structure and thermally activated. The binders can be dyed with improved depth of shading as compared to polyethylene terephthalate having the same I.V.

Example 5

Low Viscosity PET Polyesteramide Containing NPG and 4-Aminomethylcyclohexanemethanol A total of 97 g. (0.5 mole) of dimethyl terephthalate, 104 g.(1.0 mole) of NPG, 12.4 g. (0.2 mole) of ethylene glycol, 35 ppm of Ti (as titanium tetraisopropoxide in butanol solution) and 60 ppm Mn (as manganese acetate) were placed in a 500-ml flask and heated in a Wood's metal bath at 200 degrees C. with stirring under nitrogen for 90 minutes. A partial vacuum (250 mm. Hg) was then applied to remove the last traces of methanol. The product was cooled to room temperature and 14.3 g. (0.1 mole) of 4-aminomethylcyclohexanemethanol and 75 ppm of P (as tributyl phosphate) were added to the flask. The flask was then heated at 200° C. with stirring under nitrogen for 90 minutes. The temperature of the bath was increased to 275° C. and held for 15 minutes. A vacuum was gradually applied and maintained at 0.5 mm. of Hg for 60 minutes. The product was cooled to room temperature under nitrogen and removed from the flask. The product was a clear, amorphous PET polyesteramide containing 8 mole % ethylene glycol, 72 mole % NPG and 20 mole % 4-aminomethylcyclohexanemethanol (determined by Nuclear Magnetic Resonance analysis). It has a glass transition temperature of 87° C. and an I.V. of 0.68. Samples of this polymer were dried at 60° C. and spun into monofilament fibers at 285 ° C. using a one hole spinnerette with diameter of 0.5 mm to provide drawn fibers of 5 denier/filament. These fibers are useful as binder fibers for polyester fibers. They are also readily dyed to a deep shade at 200° F. using a formula containing Disperse Red 60. Thus, this example demonstrates the improved depth of shading that can be achieved through the use of the polyesters of the invention.

We claim:

1. A fiber comprising a polyester formed from the reaction product of:
   a glycol component with a dicarboxylic acid component;
   wherein the glycol component comprises neopentyl glycol in an amount ranging from about 8 to about 100 mole % and ethylene glycol in an amount ranging from about 0 to about 92 mole %; and
   wherein the dicarboxylic acid component comprises at least about 50 mole % of a dicarboxylic acid component which is an acid, anhydride, acid chloride or ester of an aromatic dicarboxylic acid containing from about 8 to about 14 carbon atoms, an aliphatic dicarboxylic acid containing from about 4 to about 12 carbon atoms, a cycloaliphatic dicarboxylic acid having about 8 to about 12 carbon atoms or mixtures thereof; and
   wherein the fiber has a denier of less than about 75.

2. The fiber of claim 1, wherein the fiber is a binder fiber.

3. The fiber of claim 2, wherein the binder fiber is a unicomponent binder fiber.

4. The fiber of claim 2, wherein the binder fiber is a multicomponent binder fiber.

5. The fiber of claim 2, wherein the fiber is a multicomponent binder fiber having side by side configuration.

6. The fiber of claim 2, wherein the fiber is a multicomponent fiber and wherein the polyester is a tie layer adhesion promoter.

7. The binder fiber of claim 2, wherein the binder fiber may be activated by heat.

8. The binder fiber of claim 2, wherein the binder fiber may be activated by ultrasonic and radio frequencies.

9. The fiber of claim 1, wherein the I.V. of the polyester ranges from about 0.36 to about 0.80.

10. The fiber of claim 1, wherein the polyester is formed in the presence of a catalyst system comprising up to about 35 ppm Ti.

11. The fiber of claim 1, wherein the polyester does not contain any antimony catalytic materials.

12. The fiber of claim 1, wherein the polyester is formed in the presence of a catalyst system comprising about 10 to about 35 ppm Ti, about 0 to about 70 ppm Mn, about 0 to about 90 ppm Co and in the presence of a catalytic inhibitor comprising about 40 to about 90 ppm P based on the weight of the polyester.

13. The fiber of claim 1, wherein the dicarboxylic acid component is an ester or mixture of esters of terephthalic acid, isophthalic acid, naphthalenedicarboxylic acid or 1,3- or 1,4-cyclohexanedicarboxylic acid.

14. The fiber of claim 1, wherein the polyester is formed in the presence of up to about 20 mole % of at least one amine compound selected from the group consisting of aminoalcohols, aminoacids, diamines, lactams and mixtures thereof.

15. The fiber of claim 1, wherein the fiber has a denier ranging from about 75 to microdenier sizes.

16. The fiber of claim 1, wherein the fiber has a denier ranging from about 20 to about 1.

17. The fiber of claim 1, wherein the fiber is a melt blend of the polyester with a polyolefin or a functionalized polyolefin.

18. A binder fiber comprising a polyester formed from the reaction product of:
   a glycol component with a dicarboxylic acid component, wherein the glycol component comprises neopentyl glycol in an amount ranging from about 8 to about 50 mole % and ethylene glycol in an amount ranging from about 50 to about 92 mole %;
   wherein the dicarboxylic acid component comprises at least about 50 mole % of a dicarboxylic acid component which is an acid, anhydride, acid chloride or ester of an aromatic dicarboxylic acid containing from about 8 to about 14 carbon atoms, an aliphatic dicarboxylic acid containing from about 4 to about 12 carbon atoms, a cycloaliphatic dicarboxylic acid having about 8 to about 12 carbon atoms or mixtures thereof; and
   wherein the polyester has an I.V. of less than 0.7; and
   the fiber has a denier of less than about 75.

19. The binder fiber of claim 18, wherein the polyester has an I.V. of between about 0.45 to 0.65.

20. The binder fiber of claim 18, wherein the polyester is formed in the presence of a catalyst system comprising up to about 35 ppm Ti.

21. The binder fiber of claim 18, wherein the polyester is formed in the presence of up to about 20 mole % of at least one amine compound selected from the group consisting of aminoalcohols, aminoacids, diamines, lactams and mixtures thereof.

22. A bicomponent binder fiber comprising:
   about 25 to about 90% by weight of a polymeric core portion; and
   about 10 to about 75% by weight of a sheath portion;
   wherein the sheath portion is formed from the reaction product of a glycol component with a dicarboxylic acid component, wherein the glycol component comprises neopentyl glycol in an amount ranging from about 8 to about 50 mole % and ethylene glycol in an amount ranging from about 50 to about 92 mole %;
   wherein the dicarboxylic acid component comprises at least about 50 mole % of a dicarboxylic acid component which is an acid, anhydride, acid chloride or ester of an aromatic dicarboxylic acid containing from about 8 to about 14 carbon atoms, an aliphatic dicarboxylic acid containing from about 4 to about 12 carbon atoms, a cycloaliphatic dicarboxylic acid having about 8 to about 12 carbon atoms or mixtures thereof; and
   wherein the polyester has an I.V. of between about 0.4 to 0.7.

23. The bicomponent fiber of claim 22, wherein the core portion is a polymeric material selected from the group consisting of polyethylene terephthalate, polycyclohexylenedimethylene terepthalate, polytrimethylene terephthalate, polybutylene terephthalate, polylactic acid or mixtures thereof.

24. A polyester formed from the reaction product of:
   a glycol component with a dicarboxylic acid component, wherein the glycol component comprises neopentyl glycol in an amount ranging from about 12 to about 100 mole % and ethylene glycol in an amount ranging from about 0 to about 92 mole %;
   wherein the dicarboxylic acid component comprises at least about 50 mole % of a dicarboxylic acid component which is an acid, anhydride, acid chloride or ester of an aromatic dicarboxylic acid containing from about 8 to about 14 carbon atoms, an aliphatic dicarboxylic acid containing from about 4 to about 12 carbon atoms, a cycloaliphatic dicarboxylic acid having about 8 to about 12 carbon atoms or mixtures thereof; and
   wherein the polyester is formed in the presence of a catalyst system comprising up to about 35 ppm Ti.

25. The polyester of claim 24, wherein the polyester does not contain any antimony catalytic materials.

26. The polyester of claim 24, wherein the polyester is formed in the presence of a catalyst system comprising about 10 to about 35 ppm Ti, about 0 to about 70 ppm Mn, about 0 to about 90 ppm Co and in the presence of a catalytic inhibitor comprising about 40 to about 90 ppm P based on the weight of the polyester.

27. The polyester of claim 24, wherein the polyester is formed in the presence of up to 20 mole % of at least one amine compound selected from the group consisting of aminoalcohols, aminoacids, diamines, lactams and mixtures thereof.

28. The polyester of claim 24, wherein the polyester is melt blended with a polyolefin, a functionalized polyolefin or another polyester.

29. The polyester of claim 24, wherein the polyester is capable of accepting higher concentrations of additives than a polyethylene terephthalate polymer having the same I.V.

30. A fiber formed from the polyester of claim 24, wherein the fiber is capable of being dyed to a deeper shade than a polyethylene terephthalate fiber having the same I.V.

31. A fiber formed from the polyester of claim 24, wherein the fiber possesses enhanced printability than a polyethylene terephthalate fiber having the same I.V.

32. Melt blends of polyamides, cellulose esters, polycarbonates, polyolefins, functionalized polyolefins and other polyesters with the polyesters of claim 24, wherein the combination is used as an additive with another polymer.

* * * * *